United States Patent [19]

Potts

[11] Patent Number: 5,412,982
[45] Date of Patent: May 9, 1995

[54] WINDSOCK SUPPORT

[76] Inventor: James K. Potts, 12750 W. Montana Dr., Lakewood, Colo. 80228

[21] Appl. No.: 208,366

[22] Filed: Mar. 10, 1994

[51] Int. Cl.⁶ ............................................. A63B 53/00
[52] U.S. Cl. ................................. 73/170.05; 116/174; 248/289.1
[58] Field of Search ........... 73/170.05, 170.06, 170.07; 116/174, 265; 248/289.1, 415

[56] References Cited

U.S. PATENT DOCUMENTS

| | | | |
|---|---|---|---|
| 3,696,672 | 10/1972 | Lindsay | 73/170.07 |
| 3,871,220 | 3/1975 | Hillman | 73/170.08 |
| 4,152,933 | 5/1979 | Woodhouse | 73/170.07 |
| 4,286,463 | 9/1981 | Cole | 73/170.07 |
| 4,554,885 | 11/1985 | Burny, Jr. | 116/174 |
| 4,800,834 | 1/1989 | Feng | 116/174 X |
| 4,850,798 | 7/1989 | Bailey | 73/170.05 X |
| 5,042,419 | 8/1991 | Bianco | 116/174 X |
| 5,070,809 | 12/1991 | Fox et al. | 116/174 |
| 5,115,756 | 5/1992 | Maffei | 116/174 X |
| 5,117,690 | 6/1992 | Baer | 73/170.07 |
| 5,271,593 | 12/1993 | Kinner et al. | 248/289.1 X |

Primary Examiner—Richard E. Chilcot, Jr.
Assistant Examiner—Elizabeth L. Dougherty

[57] ABSTRACT

A mounting tube is arranged to be received in a snug interfitting relationship a support post and is, accordingly, readily detachable from the support post. The mounting tube includes a cup member having a top wall rotatably mounting an L-shaped rod through a bushing, such that the L-shaped rod projects radially beyond the mounting tube to support a windsock member. The L-shaped rod is maintained within the cup member by spaced abutment washers mounted to a first leg of the L-shaped rod, with the second leg of the L-shaped rod projecting beyond the cup member to support the windsock.

6 Claims, 3 Drawing Sheets

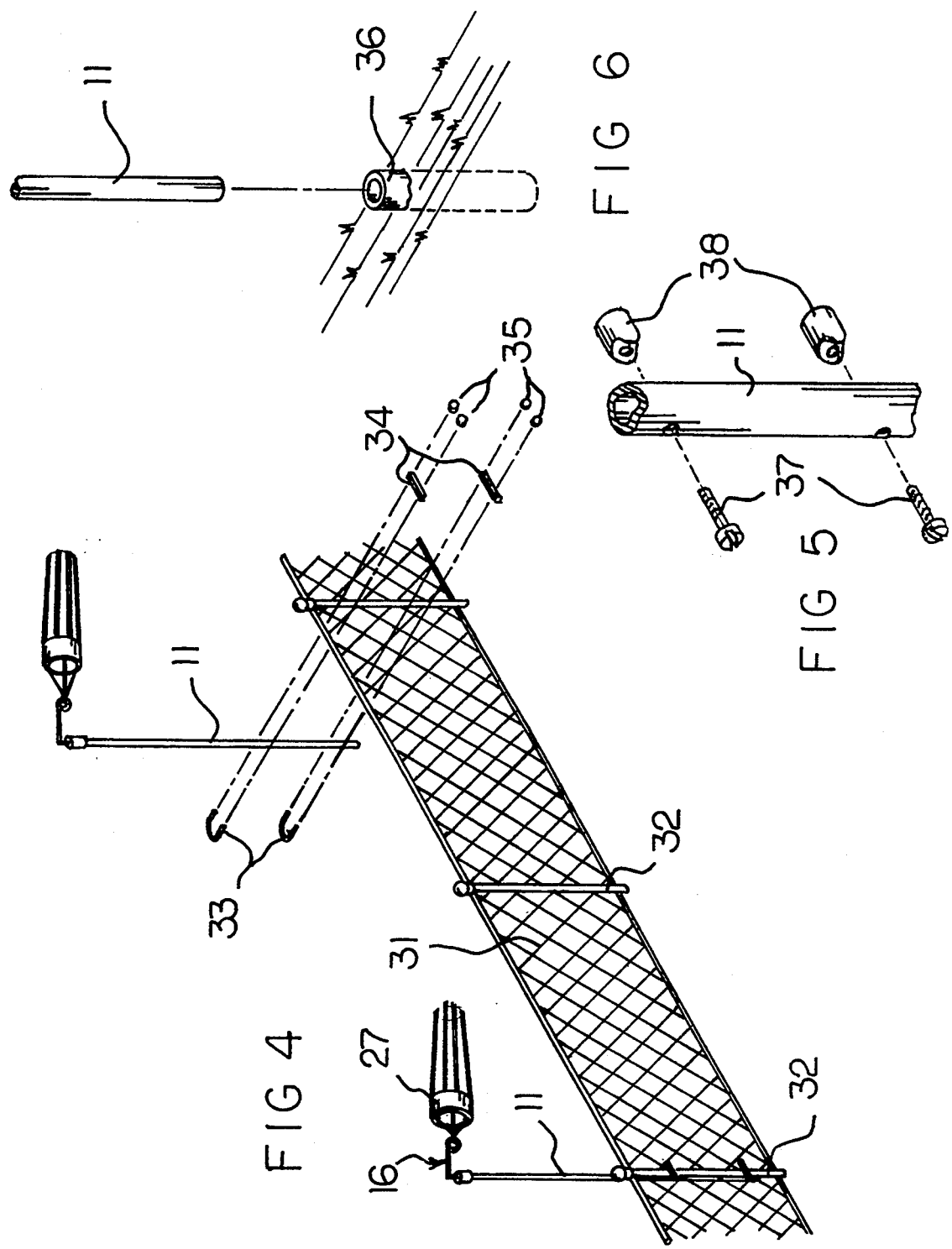

WINDSOCK SUPPORT

BACKGROUND OF THE INVENTION

1. Field of the Invention

The field of invention relates to windsock structure, and more particularly pertains to a new windsock and support wherein the same is arranged for the ease of mounting of a windsock relative to a support post.

1. Description of the Prior Art

Effective display of a windsock requires that it be free to move relative to its support without interference from adjacent structures and obstacles. A compromise used with the prior art is suspension from an overhead structure (an eave or an extending beam). Unless the locating point is centered in an unusually large area, the windsock will be blown over and become entangled with the support structure. Another compromise is attachment at the top of a pole. In this case, the sock is not free to move in the wind and becomes entangled. In all common prior art maintains, the windsock is abraded and worn by adjacent or overhead structures.

Wind or airsock structure is indicated in the prior art and exemplified by the U.S. Pat. Nos. 4,286,463; 5,117,690; 4,152,933; and 3,696,672.

The instant invention attempts to overcome deficiencies of the prior art by providing for a mounting structure for a windsock arranged for ease of use as well as effectiveness in construction and in this respect, the present invention substantially fulfills this need.

SUMMARY OF THE INVENTION

In view of the disadvantages inherent in the known types of windsock apparatus now present in the prior art, the present invention provides a windsock and support wherein the same includes a rotatably mounted L-shaped support arranged to mount a windsock in a rotatable relationship relative to an associated support post structure.

To attain this, the present invention provides a mounting tube arranged to be received in a snug interfitting relationship in a support post and is, accordingly, readily detachable from the support post. The mounting tube includes a cup member having a top wall rotatably mounting an L-shaped rod through a bushing, such that the L-shaped rod projects radially beyond the mounting tube to support a windsock member. The L-shaped rod is maintained within the cup member by spaced abutment washers mounted to a first leg of the L-shaped rod, with the second leg of the L-shaped rod projecting beyond the cup member to support the windsock.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is an object of the present invention to provide a new windsock and support which may be easily and efficiently manufactured and marketed.

It is a further object of the present invention to provide a new windsock and support which is of a durable and reliable construction.

An even further object of the present invention is to provide a new windsock and support which is susceptible of a low cost of manufacture with regard to both materials and labor, and which accordingly is then susceptible of low prices of sale to the consuming public, thereby making such windsock and supports economically available to the buying public.

Still yet another object of the present invention is to provide a new windsock and support which provides in the apparatuses and methods of the prior art some of the advantages thereof, while simultaneously overcoming some of the disadvantages normally associated therewith.

Even still yet another object of the present invention is to provide a new windsock and support in which a mounting tube includes a cup member having a top wall rotatably mounting an L-shaped rod through a bushing, such that the L-shaped rod projects radially beyond the mounting tube to support a windsock member.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is an isometric illustration indicating an exemplary mounting of the organization relative to a support fence.

FIG. 5 is an isometric exploded view arranged for the support post of the organization to receive alignment blocks for mounting to fence post structure, as indicated in FIG. 4.

FIG. 6 is an isometric illustration of the support post arranged for reception within a receiving tube positioned in subterranean environment.

DESCRIPTION OF THE PREFERRED EMBODIMENT

Figure 1:
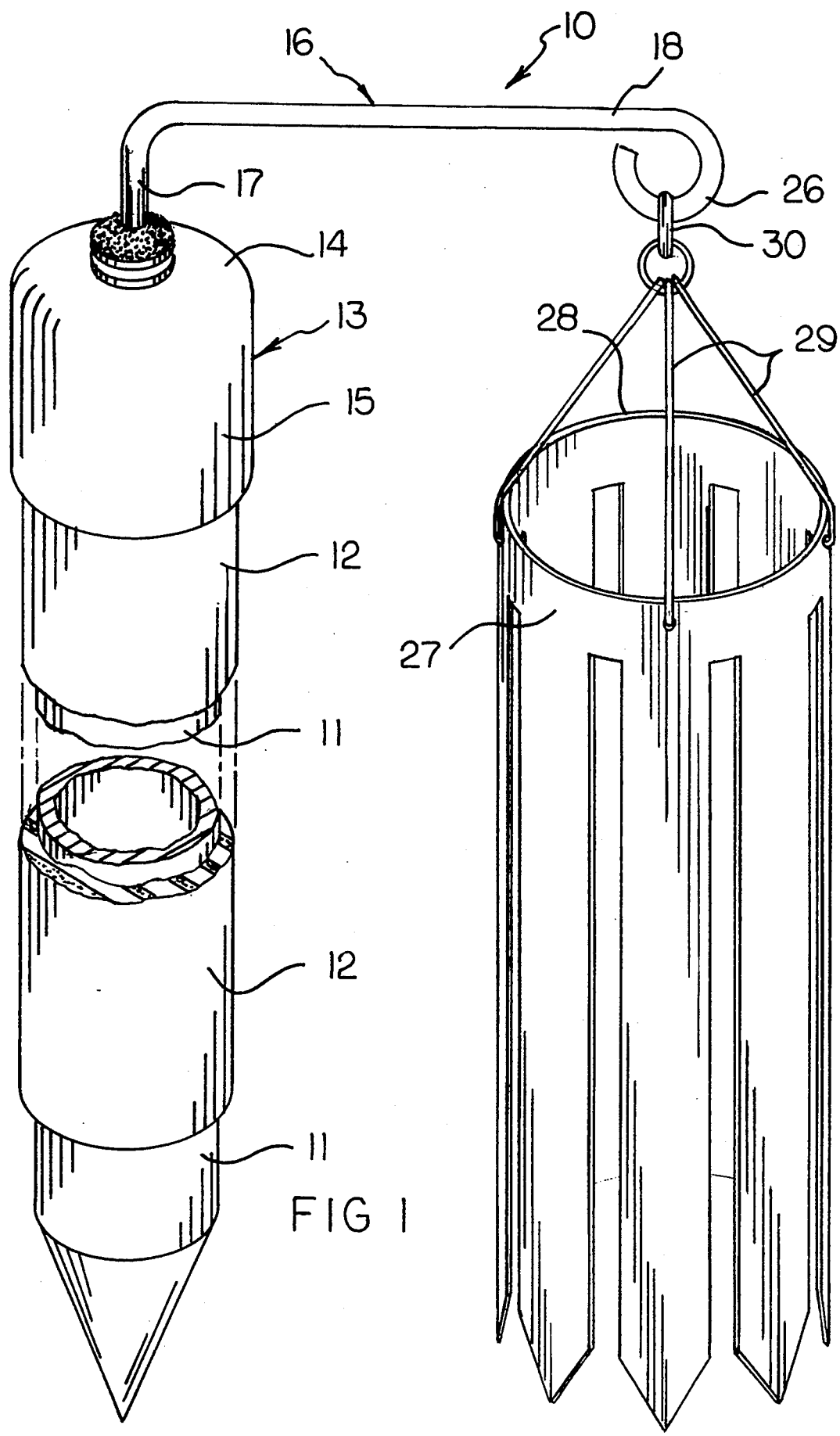
FIG. 1 is an isometric illustration of the invention.

With reference now to the drawings, and in particular to FIGS. 1–6 thereof, a new windsock and support embodying the principles and concepts of the present invention and generally designated by the reference numeral 10 will be described.

Figure 2:
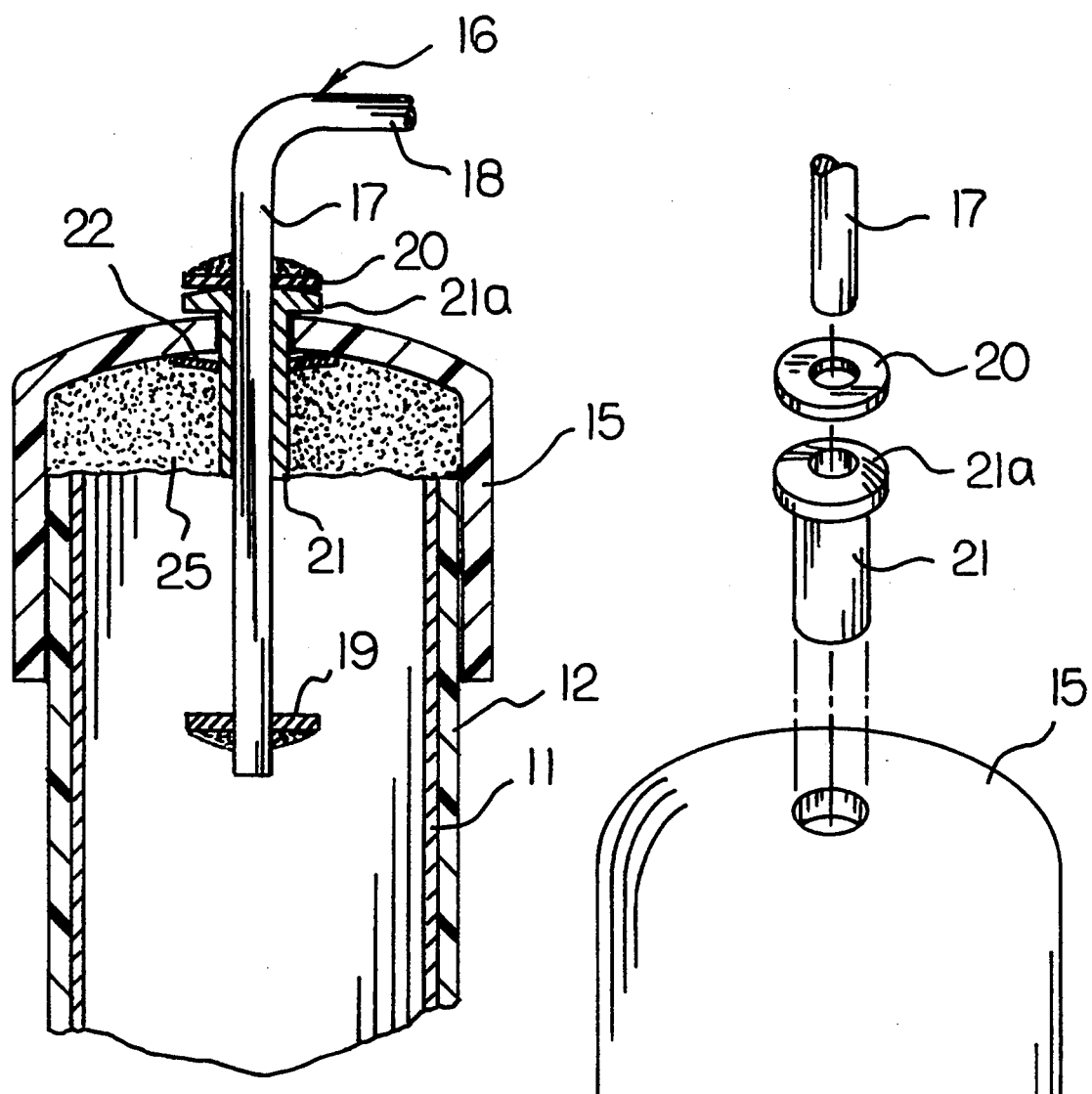
FIG. 2 is an orthographic cross-sectional illustration of the cup member mounted to the mounting tube of the invention.
Figure 3:
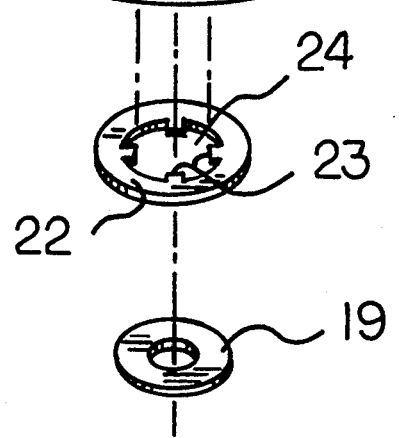
FIG. 3 is an isometric exploded view of the L-shaped rod relative to the cup member.

More specifically, the windsock and support 10 of the instant invention comprises a support post 11, wherein a mounting tube 12 receives the support post, as illustrated in FIGS. 1 and 2. The mounting tube 12 includes a cup member 13 fixedly secured to an uppermost distal end of the mounting tube 12, with the cup member 13 having a cup member top wall 14 and a cup member skirt 15 receiving the uppermost end of the mounting tube 12. An L-shaped rod 16 extends orthogonally and medially through the cup member top wall 14, with the L-shaped rod 16 including a first leg 17 directed through the top wall 14, and a second leg 18 orthogonally mounted in a fixed relationship relative to the first leg 17 extending laterally beyond the cup member skirt 15.

To rotatably mount the L-shaped rod 16 to the cup member 13, first and second abutments 19 are mounted to the first leg 17 on opposed sides of the cup member top wall 14 in a spaced relationship, with a guide bushing sleeve 21 slidably receiving the first leg 17 between the first and second abutment plates 19 and 20. It should be noted that the first and second abutment plates 19 and 20 are fixedly mounted onto the first leg 17 employing various fastening either mechanical adhesives, such as illustrated in FIG. 2, or any other suitable fastening of the abutment plates to the first leg. As the guide bushing sleeve 21 is directed through the cup member top wall 14, the bushing sleeve 21 includes a bushing sleeve abutment flange 21a arranged to engage an exterior surface of the top wall 14, with a lock ring 22 having radial tabs 23 (see FIG. 3) mounted within the ring bore 24 oriented such that the lock ring bore 24 receives the guide bushing sleeve 21 to capture the cup member top wall 14 between the guide bushing sleeve 21 and the lock ting 22, such as illustrated in the FIG. 2 for example. Further as illustrated in FIG. 2, a rigid stabilizing material 25 is positioned within the cup member 13 in surrounding relationship relative to the guide bushing sleeve 21 within the cup member 13, with the stabilizing material 25 extending from the bushing sleeve 21 to the cup member skirt 15 within the cup member.

As illustrated in FIG. 1 for example, the second leg 18 is formed with a second leg loop 26 at its outermost distal end arranged to support a windsock structure 27, generally of a cylindrical configuration, having an annular first end 28 having flexible support tethers 29 extending therefrom and secured spaced from the first end 28 to a mounting ring 30 that in turn is received onto the second leg loop 26 permitting pivoting of the windsock structure 27, such as illustrated in FIG. 4.

FIG. 4 illustrates a support fence 31 having fence posts 32 such that a plurality of U-shaped mounting clamps 33 extend about the support post 11 to secure the support post to the fence post 32, with a plurality of fasteners 37 directed through the support post 11 and through an individual alignment block 38, as shown in FIG. 5. The alignment block 38 includes a concave mating face relative to the support post providing ease of mounting to the support post relative to a further support such as the fence web of the fence 31. The FIG. 5 further notes that the use of individual fasteners 37 directed through the support post 11 and through the alignment blocks 38 are such that the organization permits its ease of retrofit mounting to various fence structure such as planar boards as typically employed about wooden decks and the like. Such planar boards accordingly would receive the fasteners 37 therethrough permitting the ease of mounting to such structure. The FIG. 6 indicates that a receiving tube 36 positioned within a subterranean surface is also available to receive a support post 11 as an alternative manner of mounting of the organization.

As to the manner of usage and operation of the instant invention, the same should be apparent from the above disclosure, and accordingly no further discussion relative to the manner of usage and operation of the instant invention shall be provided.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as encompass all such modifications as well as all relationships equivalent to those illustrated in the drawings and described in the specification.

Finally, it will be appreciated that the purpose of the Abstract provided at the beginning of this specification is to enable the U.S. Patent and Trademark Office and the public generally, and especially the scientists, engineers and practitioners in the art who are not familiar with patent or legal terms of phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A windsock support comprising:
   a support post having an upper end;
   a mounting tube received over said upper end of said support post, said mounting tube having an uppermost distal end;
   a cup member fixedly secured to said uppermost distal end of said mounting tube, the cup member having a cup member top wall and a cup member skirt;
   an L-shaped rod having a first leg and a second leg orthogonally mounted in a fixed relationship relative to the first leg, with the first leg rotatably mounted to the top wall and the second leg extending laterally beyond the cup member skirt, the second leg having a second leg outermost distal end and a second leg loop at said second leg outermost distal end, said second leg loop being operable to support a windsock structure, said cup member top wall has a through-extending aperture and the first leg is directed through said aperture of said cup member;
   a first abutment plate fixedly mounted to the first leg within the cup member;
   a second abutment plate fixedly mounted to the first leg spaced from the first abutment plate, with the second abutment plate positioned exteriorly of the cup member;

a guide bushing positioned concentrically within said aperture in said cup member top wall and slidably receiving the first leg therethrough, with the guide bushing positioned between the first abutment plate and the second abutment plate, the guide bushing having an abutment flange abutting with the cup member top wall exteriorly of the cup member, wherein said first abutment plate is spaced from said second abutment plate along said first leg a distance greater than an axial length of said guide bushing so as to permit a reciprocating axial translation of said first leg through said guide bushing; and, a lock ring receiving the guide bushing therethrough with the cup member top wall being positioned between the lock ring and the cup member top wall.

2. A windsock support as set forth in claim 1, and further comprising a rigid stabilizing material positioned within the cup member in surrounding relationship relative to the guide bushing sleeve, with the stabilizing material extending from the bushing sleeve to the cup member skirt within the cup member.

3. A windsock support as set forth in claim 2, wherein the lock ring includes a lock ring bore to receive the guide bushing therethrough, and a plurality of radial tabs directed into the lock ring bore for engaging the guide bushing.

4. A windsock support as set forth in claim 3, and further comprising a windsock of a cylindrical configuration having an annular first end with flexible support tethers extending therefrom to a mounting ring received onto the second leg loop permitting pivoting of the windsock.

5. A windsock support as set forth in claim 4, and further comprising a plurality of alignment blocks secured to said support post, with each alignment block including a concave mating face relative to the support post, said alignment block facilitating mounting the support post to a fence web of a fence.

6. A windsock support comprising:

a support post having an upper end;

a mounting tube received over said upper end of said support post, said mounting tube having an uppermost distal end;

a cup member fixedly secured to said uppermost distal end of said mounting tube, the cup member having a cup member top wall and a cup member skirt;

an L-shaped rod having a first leg and a second leg orthogonally mounted in a fixed relationship relative to the first leg, with the first leg rotatably mounted to the top wall and the second leg extending laterally beyond the cup member skirt, the second leg having a second leg outermost distal end and a second leg loop at said second leg outermost distal end, said second leg loop being operable to support a windsock structure, said cup member top wall including a through-extending aperture with the first leg being directed through said aperture of said cup member;

a first abutment plate fixedly mounted to the first leg within the cup member;

a second abutment plate fixedly mounted to the first leg spaced from the first abutment plate, with the second abutment plate positioned exteriorly of the cup member;

a guide bushing positioned concentrically within said aperture in said cup member top wall and slidably receiving the first leg therethrough, with the guide bushing positioned between the first abutment plate and the second abutment plate, the guide bushing having an abutment flange abutting with the cup member top wall exteriorly of the cup member, wherein said first abutment plate is spaced from said second abutment plate along said first leg a distance greater than an axial length of said guide bushing so as to permit a reciprocating axial translation of said first leg through said guide bushing;

a lock ring receiving the guide bushing therethrough with the cup member top wall being positioned between the lock ring and the cup member top wall, the lock ring including a lock ring bore to receive the guide bushing therethrough, and a plurality of radial tabs directed into the lock ring bore for engaging the guide bushing;

a rigid stabilizing material positioned within the cup member in surrounding relationship relative to the guide bushing sleeve, with the stabilizing material extending from the bushing sleeve to the cup member skirt within the cup member;

a windsock having an annular first end with flexible support tethers extending therefrom to a mounting ring received onto the second leg loop permitting pivoting of the windsock; and, a plurality of alignment blocks secured to said support post, each alignment block including a concave mating face relative to the support post, said alignment block facilitating mounting of the support post to a fence web of a fence.

* * * * *